(12) United States Patent
Ishiguro

(10) Patent No.: US 11,769,191 B2
(45) Date of Patent: Sep. 26, 2023

(54) INFORMATION PROCESSING APPARATUS, INFORMATION PROCESSING METHOD, INFORMATION PROVIDING SYSTEM, MACHINE LEARNING DEVICE, AND INFERENCE DEVICE

(71) Applicant: Mitsubishi Electric Corporation, Tokyo (JP)

(72) Inventor: Takehiro Ishiguro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/417,384

(22) PCT Filed: Mar. 5, 2020

(86) PCT No.: PCT/JP2020/009467
§ 371 (c)(1),
(2) Date: Jun. 23, 2021

(87) PCT Pub. No.: WO2020/184385
PCT Pub. Date: Sep. 17, 2020

(65) Prior Publication Data
US 2022/0092667 A1    Mar. 24, 2022

(30) Foreign Application Priority Data

Mar. 13, 2019    (WO) .................. PCT/JP2019/010343

(51) Int. Cl.
*G06Q 30/00*        (2023.01)
*G06Q 30/0601*      (2023.01)
(Continued)

(52) U.S. Cl.
CPC ........... *G06Q 30/0627* (2013.01); *G06N 3/04* (2013.01); *G06Q 30/0282* (2013.01)

(58) Field of Classification Search
CPC .............................. G06Q 30/0627; G06N 3/04
See application file for complete search history.

(56) References Cited

U.S. PATENT DOCUMENTS 7,406,436 B1 * 7/2008 Reisman ............ G06Q 30/0282
                                                        705/7.33
10,762,537 B2 * 9/2020 Albinger ............ G06Q 30/0269
(Continued)

FOREIGN PATENT DOCUMENTS

| CN | 102999849 A | 3/2013 |
| CN | 103748607 A | 4/2014 |

(Continued)

OTHER PUBLICATIONS

"Product Focus," Anonymous. MoldMaking Technology21.9: 52-62. Gardner Business Media Inc; Dialog #2109148167, 7pgs (Sep. 2018) (Year: 2018).*

(Continued)

*Primary Examiner* — Robert M Pond
(74) *Attorney, Agent, or Firm* — XSENSUS LLP

(57) ABSTRACT

An equipment introduction effect analyzer as an information processing apparatus includes: an equipment-related information storage unit that holds equipment data including information on equipment and information on a function and performance included in equipment, and equipment buyer data including information on an effect obtained when an equipment buyer introduces equipment, information on a use environment of the equipment, and information on the purchased equipment; and an evaluation engine unit that generates information on an effect to be provided to a potential equipment buyer based on the information on the effect and the information on the use environment of equipment that are included in the equipment buyer data, and on the basis of information on an environment in which the potential equipment buyer uses the equipment, the equip- (Continued)

ment buyer data being acquired from the equipment buyer already purchased equipment with a function and performance desired by the potential equipment buyer.

11 Claims, 8 Drawing Sheets

(51) Int. Cl.
*G06N 3/04* (2023.01)
*G06Q 30/0282* (2023.01)

(56) References Cited

U.S. PATENT DOCUMENTS

| | | | | |
|---|---|---|---|---|
| 2002/0184135 | A1* | 12/2002 | Zakaria | G06Q 40/04 705/37 |
| 2004/0236495 | A1* | 11/2004 | Koenen | A01D 34/001 701/115 |
| 2004/0260490 | A1* | 12/2004 | Matsubayashi | H02J 3/003 702/60 |
| 2005/0149410 | A1* | 7/2005 | Livesay | G06Q 30/0633 705/26.8 |
| 2014/0108202 | A1 | 4/2014 | Masuko | |
| 2016/0210418 | A1 | 7/2016 | Ohta et al. | |
| 2016/0364734 | A1* | 12/2016 | Glanville | G06Q 30/0201 |
| 2018/0150885 | A1* | 5/2018 | Albinger | G06Q 30/0251 |

FOREIGN PATENT DOCUMENTS

| | | |
|---|---|---|
| JP | 11-7472 A | 1/1999 |
| JP | 2003-123000 A | 4/2003 |
| JP | 2003-208540 A | 7/2003 |
| JP | 2003208540 A * | 7/2003 |
| JP | 2008-217459 A | 9/2008 |
| JP | 2018-142105 A | 9/2018 |
| WO | 2015/045948 A1 | 4/2015 |

OTHER PUBLICATIONS

Chinese Office Action dated Mar. 21, 2022, in Chinese Application No. 202080019711.7.
International Search Report and Written Opinion dated Jun. 2, 2020, received for PCT Application PCT/JP2020/009467, Filed on Mar. 5, 2020, 8 pages including English Translation.
Decision to Grant dated Oct. 27, 2020, received for JP Application 2020-540514, 5 pages including English Translation.
Office Action dated Sep. 5, 2022, in corresponding Chinese patent Application No. 202080019711.7, 23 pages.
Office Action dated Jan. 6, 2023, in corresponding Chinese patent Application No. 202080019711.7, 31 pages.

* cited by examiner

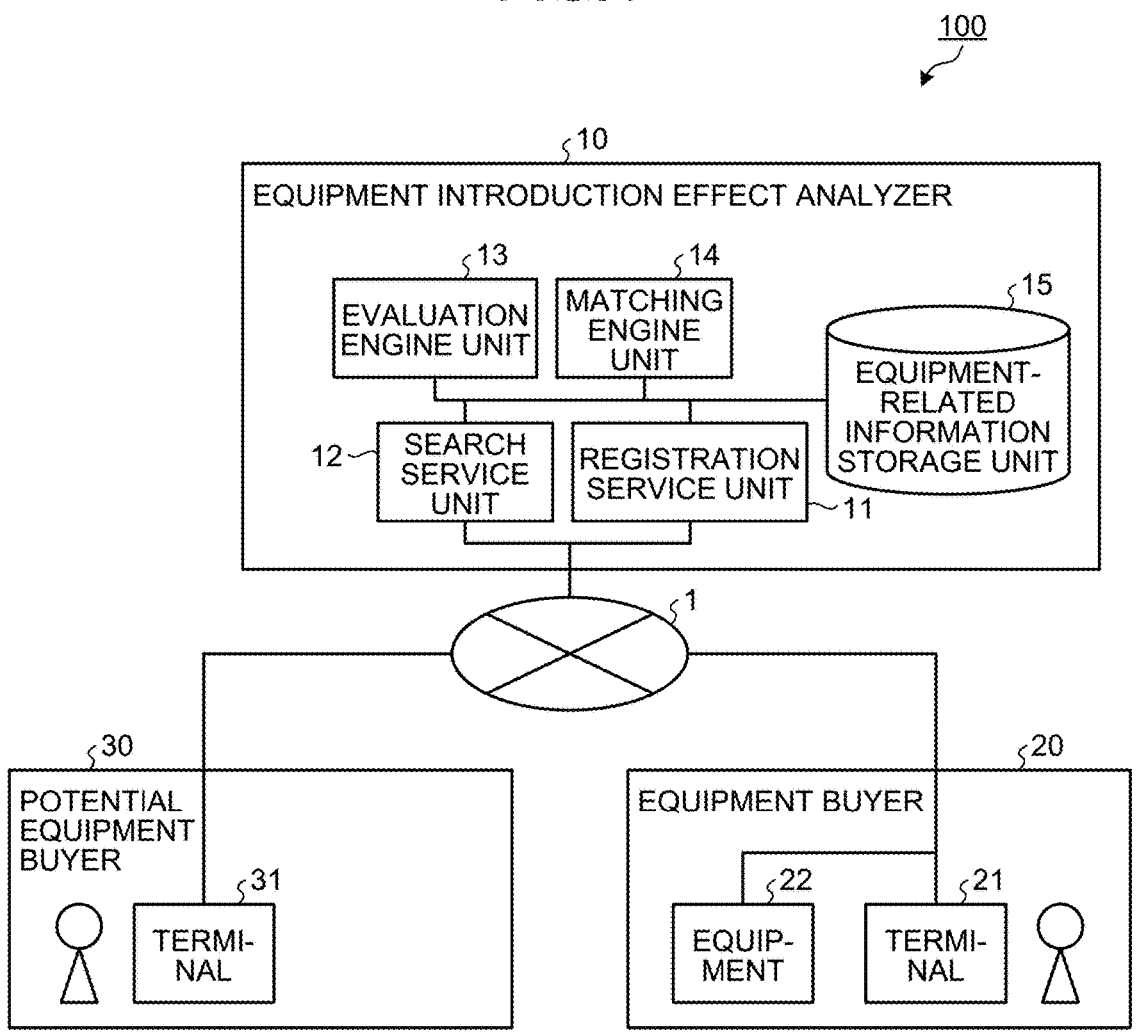

| USER | USE ENVIRONMENT |
|---|---|
| U0001 | - |
| ... | ... |

| EQUIPMENT MANUFACTURER NAME | EQUIPMENT NAME | PRICE | FUNCTION | PERFORMANCE |
|---|---|---|---|---|
| M0001 | EQUIPMENT A | ¥xx,xxx | WITH ○○ WITHOUT ×× | ... |
| ... | ... | ... | ... | ... |

INFORMATION PROCESSING APPARATUS, INFORMATION PROCESSING METHOD, INFORMATION PROVIDING SYSTEM, MACHINE LEARNING DEVICE, AND INFERENCE DEVICE

CROSS-REFERENCE TO RELATED APPLICATIONS

The present application is based on PCT filing PCT/JP2020/009467, filed Mar. 5, 2020, which claims priority to JP PCT/JP2019/010343, filed Mar. 13, 2019, the entire contents of each are incorporated herein by reference.

FIELD

The present invention relates to an information processing apparatus, an information processing method, an information providing system, a machine learning device, and an inference device, for providing information to a potential buyer considering purchasing equipment or a device.

BACKGROUND

An information providing apparatus described in Patent Literature 1 is available as a conventional information processing apparatus that provides information to a potential buyer of equipment or the like, the information being necessary for considering the purchase thereof.

The information providing apparatus described in Patent Literature 1 provides a picture obtained by imaging a state of equipment that is already sold and in operation, to another user who is planning to purchase the equipment, thereby communicating effects when the equipment is introduced and promoting the purchase thereof.

CITATION LIST

Patent Literature

Patent Literature 1: Japanese Patent Application Laid-open No. 2003-208540

SUMMARY

Technical Problem

In the invention described in Patent Literature 1, a moving image acquired from a user who has purchased equipment, information on effects of introducing the equipment, and the like are combined and provided to a new user. However, in the invention described in Patent Literature 1, data such as the moving image acquired from the user and the information on the effects of introducing the equipment is provided as is, so that it is difficult for the new user to directly determine whether to purchase the equipment from the provided data. In order to obtain really necessary information, a potential equipment buyer himself or his supporter needs to perform work such as analyzing the provided data separately.

The present invention has been made in view of the above, and an object of the present invention is to provide an information processing apparatus that can provide information necessary for a potential buyer, who is considering purchasing equipment, in a form usable by the potential buyer.

Solution to Problem

An information processing apparatus according to an aspect of the present invention includes an equipment-related information storage unit that holds equipment data and equipment buyer data, the equipment data including information on a function included in equipment and performance of the equipment, and the equipment buyer data including information on an effect obtained when an equipment buyer already purchased the equipment introduces the purchased equipment, information on a use environment of the purchased equipment, and information on the purchased equipment. The information processing apparatus further includes an evaluation engine unit that generates information on an effect to be provided to a potential equipment buyer, who is considering purchasing equipment, on the basis of the information on the effect and the information on the use environment of equipment that are included in the equipment buyer data and on the basis of information on an environment in which the potential equipment buyer uses the equipment, the equipment buyer data being acquired from the equipment buyer already purchased equipment with a function and performance desired by the potential equipment buyer.

Advantageous Effects of Invention

The information processing apparatus according to the present invention can provide the information necessary for the potential buyer, who is considering purchasing equipment, in the form usable by the potential buyer.

BRIEF DESCRIPTION OF DRAWINGS

FIG. 1 is a diagram illustrating an example of a configuration of an information providing system that includes an information processing apparatus according to a first embodiment.

FIG. 2 is a table illustrating an example of an equipment buyer data table held in an equipment introduction effect analyzer according to the first embodiment.

FIG. 3 is a table illustrating an example of a potential equipment buyer data table held in the equipment introduction effect analyzer according to the first embodiment.

FIG. 4 is a table illustrating an example of an equipment data table held in the equipment introduction effect analyzer according to the first embodiment.

DESCRIPTION OF EMBODIMENTS

Figure 5:
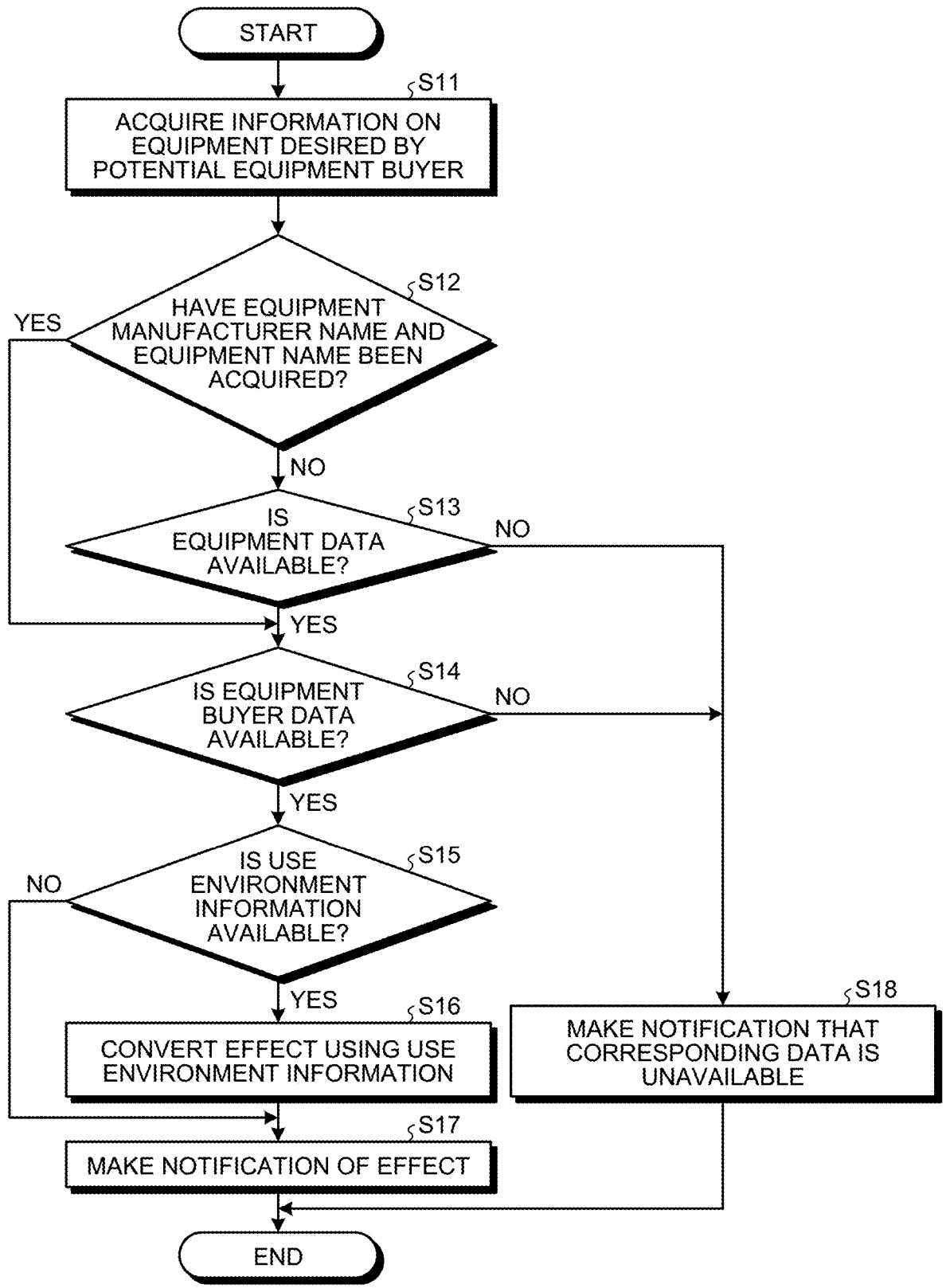
FIG. 5 is a flowchart illustrating an example of an operation of the equipment introduction effect analyzer according to the first embodiment.

Hereinafter, an information processing apparatus, an information processing method, an information providing system, a machine learning device, and an inference device according to embodiments of the present invention will be described in detail with reference to the drawings. Note that the present invention is not limited to the embodiments.

First Embodiment

FIG. 1 is a diagram illustrating an example of a configuration of an information providing system that includes an information processing apparatus according to a first embodiment.

An information providing system 100 according to the present embodiment includes an equipment introduction effect analyzer 10 that is an information processing apparatus, a terminal 21 and equipment 22 owned by an equipment buyer 20 as a user who has purchased the equipment, and a terminal 31 owned by a potential equipment buyer 30 who considers the purchase of equipment to be newly introduced. The equipment 22 is equipment that has been purchased and introduced by the equipment buyer 20. The equipment introduction effect analyzer 10, the terminal 21, the equipment 22, and the terminal 31 are connected to a network 1 such as the Internet. The equipment introduction effect analyzer 10 can communicate with the terminal 21, the equipment 22, and the terminal 31. Note that although not illustrated in FIG. 1, there is a plurality of the equipment buyers 20 and the potential equipment buyers 30. There may also be a plurality of the equipment introduction effect analyzers 10, in which case data related to an equipment introduction effect held in each of the equipment introduction effect analyzers 10 is shared.

In the information providing system 100, the equipment introduction effect analyzer 10 collects information on an effect of the equipment 22 purchased by the equipment buyer 20, and in response to a request from the potential equipment buyer 30, generates information required by the potential equipment buyer 30 on the basis of the information being held and provides the generated information thereto.

Next, the equipment introduction effect analyzer 10 of the information providing system 100 will be described. The equipment introduction effect analyzer 10 includes a registration service unit 11, a search service unit 12, an evaluation engine unit 13, a matching engine unit 14, and an equipment-related information storage unit 15.

The registration service unit 11 acquires information for creating an equipment buyer data table 200 illustrated in FIG. 2 from one or both of the terminal 21 and the equipment 22 of the equipment buyer 20, and registers the information in the equipment buyer data table 200. FIG. 2 is a table illustrating an example of the equipment buyer data table 200 held in the equipment introduction effect analyzer 10 according to the first embodiment. The equipment buyer data table 200 is held in the equipment-related information storage unit 15. The equipment buyer data table 200 includes information such as user 201, equipment manufacturer name 202, equipment name 203, price 204, effect 205, use environment 206, and comment 207. Details of each information included in the equipment buyer data table 200 will be described later.

Moreover, the registration service unit 11 acquires information for creating a potential equipment buyer data table 300 illustrated in FIG. 3 from the terminal 31 of the potential equipment buyer 30, and registers the information in the potential equipment buyer data table 300. FIG. 3 is a table illustrating an example of the potential equipment buyer data table 300 held in the equipment introduction effect analyzer 10 according to the first embodiment. The potential equipment buyer data table 300 is held in the equipment-related information storage unit 15. The potential equipment buyer data table 300 includes information such as user 301 and use environment 302. Details of each information included in the potential equipment buyer data table 300 will be described later.

Moreover, the registration service unit 11 acquires information for creating an equipment data table 400 illustrated in FIG. 4 from an equipment manufacturer or a person who has equivalent information not illustrated in FIG. 1, and registers the information in the equipment data table 400. FIG. 4 is a table illustrating an example of the equipment data table 400 held in the equipment introduction effect analyzer 10 according to the first embodiment. The equipment data table 400 is held in the equipment-related information storage unit 15. The equipment data table 400 includes information such as equipment manufacturer name 401, equipment name 402, list price 403, function 404, and performance 405. Details of each information included in the equipment data table 400 will be described later.

Upon receiving an inquiry from the terminal 31 of the potential equipment buyer 30, the search service unit 12 generates data to be provided to the potential equipment buyer 30 on the basis of the information held in the equipment-related information storage unit 15, and transmits the data to the terminal 31 from which the inquiry is made. A method by which the search service unit 12 generates the data will be described later. Note that in the present embodiment, the registration service unit 11 and the search service unit 12 are configured separately, but may be integrated as one service.

When receiving an inquiry about an effect of each equipment from the terminal 31 of the potential equipment buyer 30, the evaluation engine unit 13 refers to the effect 205, the use environment 206 of the equipment buyer 20, and the use environment 302 of the potential equipment buyer 30 which are registered in the equipment-related information storage unit 15, thereby adjusting the basic units or the like, for example, and evaluating how much effect each potential equipment buyer 30 can receive.

On the basis of the information of the use environments 206 and 302 registered in the equipment-related information storage unit 15, the matching engine unit 14 extracts information of the equipment buyer 20 who is using the equipment in a situation similar to a situation in which the equipment is to be used by the potential equipment buyer 30, and selects a case that is highly effective for the potential equipment buyer 30.

The equipment-related information storage unit 15 holds the equipment buyer data table 200 illustrated in FIG. 2, the potential equipment buyer data table 300 illustrated in FIG. 3, and the equipment data table 400 illustrated in FIG. 4.

The terminal 21 and the equipment 22 of the equipment buyer 20 are connected to the registration service unit 11 of the equipment introduction effect analyzer 10 via the network 1, so that information such as the price and the effect such as staff reduction regarding the equipment already purchased and used is transmitted from the terminal 21, for example, and effects such as power consumption and takt time that can be automatically collected and calculated by a sensor or the like are transmitted from the equipment 22, for example.

The terminal 31 of the potential equipment buyer 30 is a potential equipment buyer terminal, and is connected to the search service unit 12 of the equipment introduction effect analyzer 10 via the network 1, thereby transmitting information such as the function, price, and effect of desired equipment, for example, and acquiring information related to the equipment such as the equipment manufacturer name and equipment name corresponding to the transmitted information from the equipment introduction effect analyzer 10.

Next, each information held in the equipment-related information storage unit 15 of the equipment introduction effect analyzer 10 will be described.

First, the information included in the equipment buyer data table 200 illustrated in FIG. 2 will be described. The user 201 is identification information of the equipment buyer 20, and is a unique identification (ID) assigned to the equipment buyer 20 when he uses the information providing system 100. The equipment manufacturer name 202 is basically information indicating the equipment manufacturer, but may be information indicating the seller of the equipment. The equipment manufacturer name 202 is second information used in a search performed by the search service unit 12. The equipment name 203 is an identification name such as the name, designation, or model name of the equipment, and the equipment manufacturer name 202 and the equipment name 203 serve as information for identifying single equipment. Moreover, for equipment including a combination of a plurality of pieces of equipment, the plurality of pieces of equipment can be represented by one name by giving thereto another name indicating the plurality of pieces of equipment as a whole, that is, a name indicating a group of pairs of the equipment manufacturer name and the equipment name of the respective plurality of pieces of equipment combined. The plurality of pieces of equipment may be represented by giving the model name thereto instead of the name. The equipment name 203 is first information used in a search performed by the search service unit 12. The price 204 is the cost when the equipment buyer 20 purchases the equipment, and is not a required item because it may be desired to not disclose the price. The effect 205 is an effect including both good and bad aspects when the equipment is used, and is basically a quantitative expression such as energy consumption or man-hours of work, or information representing a change thereof. However, the effect 205 is not limited to the quantitative description such as a numerical value because there may be a case where the effect cannot be expressed quantitatively such as when a qualitative expression with a subjective view of a user is to be included. The use environment 206 is information on the environment in which the equipment is used, and indicates parameters affecting the cost (negative aspect) and the effect (positive aspect) of the equipment such as information on a product used in combination with the equipment as well as electricity charges, the wage of a person operating the equipment, the climate of a place where the equipment is installed, and the frequency of maintenance that affect the gradient of the running cost of the equipment. The comment 207 is the impression, special notes, or the like when the user uses the equipment, and is information that can be input as information not included in the effect 205 but to be communicated to the potential equipment buyer 30, and is referred to by the potential equipment buyer 30.

Next, the information included in the potential equipment buyer data table 300 illustrated in FIG. 3 will be described. The user 301 is identification information of the potential equipment buyer 30, and is a unique ID assigned to the potential equipment buyer 30 when he uses the information providing system 100. The use environment 302 is information on the environment under which the potential equipment buyer 30 uses the equipment he is considering purchasing, and indicates, for example, a product that is planned to be used simultaneously in combination with the equipment, electric charges per usage when the potential equipment buyer uses the equipment after purchasing the equipment, the wage of a person in charge when the equipment is operated, and the like.

Next, the information included in the equipment data table 400 illustrated in FIG. 4 will be described. Each data included in the equipment data table 400 is registered by the equipment manufacturer that is omitted in FIG. 1. For example, the equipment manufacturer connects to the equipment introduction effect analyzer 10 using a terminal similar to the terminals 21 and 31, and registers each information included in the equipment data table 400. The equipment manufacturer name 401 is information related to the equipment manufacturer such as the name of the equipment manufacturer or an equipment manufacturer ID. The equipment name 402 is an identification name such as a product name or a model name of the equipment. The list price 403 is information on the price of the equipment. The function 404 is information indicating the function included in the equipment. The performance 405 is information indicating the performance of the equipment. The equipment name 402, the list price 403, the function 404, and the performance 405 are information related to the equipment provided by the equipment manufacturer.

Next, the operation of the equipment introduction effect analyzer 10 will be described. Specifically, a flowchart of FIG. 5 will be used to describe the operation of the equipment introduction effect analyzer 10 when receiving information such as the cost and effect of equipment desired by the potential equipment buyer 30 from the terminal 31 of the potential equipment buyer 30, and searching for information corresponding to the received information. FIG. 5 is the flowchart illustrating an example of the operation of the equipment introduction effect analyzer 10 according to the first embodiment. Note that the present embodiment will also describe the advance preparation required before the equipment introduction effect analyzer 10 performs the operation illustrated in FIG. 5.

(Advance Preparation)

When performing the operation according to the flowchart illustrated in FIG. 5, the equipment introduction effect analyzer 10 performs in advance the preparation described below and registers information in the equipment-related information storage unit 15.

That is, a person in charge from the equipment manufacturer or a person who has information on the equipment to be registered connects a terminal to the registration service unit 11, and inputs each information (the equipment manufacturer name 401 to the performance 405) to be registered in the equipment data table 400 illustrated in FIG. 4. Upon receiving the input information, the registration service unit 11 registers the received information as equipment data in the equipment data table 400 of the equipment-related information storage unit 15.

Moreover, the equipment buyer 20 connects the terminal 21 being an equipment buyer terminal to the registration service unit 11 and inputs each information (the user 201 to the comment 207) to be registered in the equipment buyer data table 200 to the extent possible. Upon receiving the information input by the equipment buyer 20, the registration service unit 11 registers the received information as equipment buyer data in the equipment buyer data table 200 of the equipment-related information storage unit 15. Also, if possible, the registration service unit 11 automatically acquires information related to the effect of the equipment 22 from the equipment 22 of the equipment buyer 20 to the extent permitted, and registers the information as the effect 205 in the equipment buyer data table 200.

Moreover, the potential equipment buyer 30 connects the terminal 31 to the registration service unit 11 and inputs each information (the user 301 and the use environment 302) to be registered in the potential equipment buyer data table 300. Upon receiving the information input by the potential equipment buyer 30, the registration service unit 11 registers the received information as potential buyer data in the potential equipment buyer data table 300 of the equipment-related information storage unit 15.

(Search Operation)

When acquiring information such as the price of the equipment or the effect of introducing the equipment, the potential equipment buyer 30 connects the terminal 31 to the search service unit 12 of the equipment introduction effect analyzer 10 via the network 1, and inputs information on the equipment to be considered for purchase, specifically, the equipment manufacturer name and the equipment name when the equipment desired for purchase has already been specified, or information such as a desired function or performance when the equipment has not been specified. The terminal 31 transmits each input information to the search service unit 12 and requests a search. Note that the terminal 31 also transmits the identification information of the potential equipment buyer 30.

Upon acquiring each information (information on desired equipment) transmitted by the terminal 31 of the potential equipment buyer 30 (step S11), the equipment introduction effect analyzer 10 checks whether the equipment manufacturer name and the equipment name have been acquired, that is, whether the acquired information includes the equipment manufacturer name and the equipment name (step S12). The checking processing of step S12 is performed by the search service unit 12. If at least one of the equipment manufacturer name and the equipment name has not been acquired (No in step S12), the equipment introduction effect analyzer 10 executes a first search that searches the equipment data table 400 held in the equipment-related information storage unit 15 by using information related to the function or performance of the equipment included in the acquired information, and checks whether or not corresponding equipment data is available (step S13). Specifically, the search service unit 12 compares the equipment data table 400 held in the equipment-related information storage unit 15 with the information related to the function or performance of the equipment acquired in step S11, and checks whether or not the equipment data including the same information as the acquired information is in the equipment data table 400. At this time, the search service unit 12 may use the list price 403 to narrow down the equipment in a price range desired by the potential equipment buyer 30.

If the equipment data corresponding to the desire of the potential equipment buyer 30 is available (Yes in step S13), the equipment introduction effect analyzer 10 executes a second search that searches the equipment buyer data table 200 held in the equipment-related information storage unit 15 by using each information included in the equipment data found by the search in step S13, and checks whether or not corresponding equipment buyer data is available (step S14). Specifically, the search service unit 12 compares the equipment buyer data table 200 held in the equipment-related information storage unit 15 with the information included in the equipment data, and checks whether or not the equipment buyer data table 200 includes equipment buyer data including each information (the user 201, the equipment manufacturer name 202, the equipment name 203, and the like illustrated in FIG. 2) acquired from the equipment buyer 20 who has purchased the equipment desired by the potential equipment buyer 30. More specifically, the search service unit 12 checks whether or not there is equipment buyer data whose equipment manufacturer name 202 and equipment name 203 match the equipment manufacturer name 401 and the equipment name 402 included in the equipment data found by the search in step S13. Moreover, the price 204 may be used as the actual purchase price to narrow down the equipment in a price range desired by the potential equipment buyer 30.

On the other hand, if the equipment manufacturer name and the equipment name have been acquired in step S12 above (Yes in step S12), the equipment introduction effect analyzer 10 searches the equipment buyer data table 200 held in the equipment-related information storage unit 15 by using the equipment manufacturer name and the equipment name acquired in step S12, and checks whether or not corresponding equipment buyer data is available (step S14). Note that the processing in step S14 executed following step S13 is the same as the processing in step S14 executed following step S12.

If the equipment buyer data corresponding to the desire of the potential equipment buyer 30 is available (Yes in step S14), the equipment introduction effect analyzer 10 searches the equipment buyer data table 200 held in the equipment-related information storage unit 15 by using the equipment manufacturer name and the equipment name derived on the basis of each information acquired in step S11, and further searches the potential equipment buyer data table 300 using the identification information of the potential equipment buyer 30 to check whether or not corresponding use environment information is available (step S15). Specifically, the search service unit 12 checks whether use environment information (corresponding to the use environment 206 illustrated in FIG. 2) is registered in the equipment buyer data found by the search using the equipment manufacturer name and the equipment name in step S14, and whether the potential equipment buyer data table 300 includes potential buyer data in which the identification information and use environment information (corresponding to the user 301 and the use environment 302 illustrated in FIG. 3) of the potential equipment buyer 30 are registered.

If the use environment information is available, that is, if the equipment buyer data in which the corresponding use environment information is registered and the potential equipment buyer data are available (Yes in step S15), the equipment introduction effect analyzer 10 extracts the effect registered in the equipment buyer data found by the search in step S14 (corresponding to the effect 205 illustrated in FIG. 2), and converts the effect using the use environment information (step S16). In step S16, the evaluation engine unit 13 converts the information on the effect registered in the equipment buyer data into information that suits the situation of the potential equipment buyer 30 by using the use environment information registered in the equipment buyer data and the use environment information registered in the potential equipment buyer data. As an example, when the use environment information includes information such as electricity charges and wage, the evaluation engine unit 13 for example performs processing such as calculating, on the basis of a difference between the hourly wage listed on the side of the use environment 206 and the hourly wage listed on the side of the use environment 302, the labor costs of a person involved in the operation of the equipment when the same equipment as that used on the side of the use environment 206 is used on the side of the use environment 302 (the side of the potential equipment buyer 30), and calculating, from a difference in electricity charges between the two parties, the electricity charges on the side of the use environment 302 based on power consumption information of the equipment data, whereby the information on the effect (the material used for consideration by the potential equipment buyer 30 including the cost that is a negative effect) is converted.

A specific example of the processing performed by the evaluation engine unit 13 in step S16 will be illustrated. For certain machining equipment, it is assumed that the wage of a worker is registered as 1000 yen per hour as the use environment 206 in the equipment buyer data table 200, and "three hours are required for the operation of one standard machining cycle" is registered as the effect 205 or the performance 405, whereas the wage of a worker is registered as 3000 yen per hour as the use environment 302 in the potential equipment buyer data table 300. In this case, it can be seen that when the potential equipment buyer 30 purchases the machining equipment, the labor cost of 9000 yen is required for one standard machining cycle. At this time, when equipment that has been previously used by the potential equipment buyer 30 requires four hours to perform similar machining, it is calculated that the cost of 3000 yen can be reduced per operation by replacing the equipment. If the use environment 302 contains information such as the service life or the number of times of machining per day, the evaluation engine unit 13 also considers the information and calculates an amount of annual cost reduction or cost reduction in the life cycle of the equipment, thereby being able to evaluate the number of years of the expected period for recovering the cost of the price 204 or the list price 403 of the equipment, or by how much the period falls below the life cycle of the equipment. As described above, the evaluation engine unit 13 converts the information on the effect acquired from the equipment buyer 20 into the information on the effect obtained when the potential equipment buyer 30 introduces the equipment, on the basis of the use environment information acquired from the equipment buyer 20 and the use environment information acquired from the potential equipment buyer 30.

Next, the equipment introduction effect analyzer 10 notifies the terminal 31 of the potential equipment buyer 30 of the effect obtained by executing the conversion processing in step S16 (step S17), and ends the operation. The evaluation engine unit 13 performs the notification processing in step S17, that is, notifies the terminal 31 of the potential equipment buyer 30 of the effect.

If determining in step S15 that the use environment information is not available (No in step S15), the equipment introduction effect analyzer 10 notifies the terminal 31 of the potential equipment buyer 30 of the effect registered in the equipment buyer data found by the search in step S14 (step S17), and ends the operation.

Moreover, if determining that the corresponding equipment data is not available in step S13 (No in step S13), or that the corresponding equipment buyer data is not available in step S14 (No in step S14), the equipment introduction effect analyzer 10 notifies the terminal 31 of the potential equipment buyer 30 that the corresponding data is not available (step S18), and ends the operation. The search service unit 12 performs the notification processing in step S18, that is, the processing of notifying the terminal 31 that the corresponding data is not available.

Next, the effects of the equipment introduction effect analyzer 10 according to the present embodiment (effect of the present embodiment) will be described. As described above, the characteristic of the equipment introduction effect analyzer 10 according to the present embodiment is that the evaluation engine unit 13 uses the information related to the evaluation of the purchased equipment (the information of the user 201 to the comment 207 illustrated in FIG. 2) acquired from the equipment buyer 20 in advance, and the information related to the use environment (the use environment 302 illustrated in FIG. 3) acquired from the potential equipment buyer 30, thereby calculating the information on cost-effectiveness such as the payout period of the equipment considered for purchase that the potential equipment buyer 30 really wishes to know. A conventional method has had an obstacle for collecting information scattered at individual equipment installation sites, such as the purchase price of the equipment (information obtained from the equipment buyer 20) and the power consumption (information obtained from the equipment itself), into one and making it available to another potential equipment buyer 30 (due to the aspect that the information is not readily disclosed to others, for example). However, the use of the method of the present embodiment can expect not only the effect that a part of the work previously performed by each potential equipment buyer 30 or equipment salesperson for collecting and reusing information can be automated, but also the increase in the value of the equipment introduction effect analyzer 10 by collecting the information in one place so that the equipment buyer 20, the potential equipment buyer 30, and the equipment manufacturer wish to actively use the equipment introduction effect analyzer. This further allows information to be collected appropriately in the equipment introduction effect analyzer 10 so that a virtuous cycle is formed in which the potential equipment buyer 30 who is considering new purchase or replacement of equipment uses the information to be able to determine which equipment to introduce, perform appropriate asset management and equipment improvement, and provide them as information to the equipment introduction effect analyzer and the equipment buyer 20.

Second Embodiment

Next, an information processing apparatus according to a second embodiment will be described. The configuration of the information providing system including the information processing apparatus according to the present embodiment and the configuration of the equipment introduction effect analyzer being the information processing apparatus are similar to those of the first embodiment (see FIG. 1).

The first embodiment describes the most basic method of use of the present invention in which the potential equipment buyer 30 transmits information on the equipment considered for purchase to the equipment introduction effect analyzer 10, and obtains information such as the cost and effect of the desired equipment. However, if the potential equipment buyer 30 does not have a clear intention and not specify conditions such as the name of equipment specifically considered and the function or performance of the equipment, the search service unit 12 of the equipment introduction effect analyzer 10 receives an enormous number of types of inquiries so that it takes time to obtain a result convenient for the potential equipment buyer 30, or such a convenient result cannot be obtained.

Thus, the equipment introduction effect analyzer 10 according to the present embodiment has a search function described below in addition to the search function described in the first embodiment. That is, the equipment introduction effect analyzer 10 according to the present embodiment has a function of deriving more effective equipment that matches conditions such as the current equipment configuration and use environment on the side of the potential equipment buyer 30 transmitted from the terminal 31 of the potential equipment buyer 30. Hereinafter, the operation of the equipment introduction effect analyzer 10 according to the second embodiment will be described.

Figure 6:
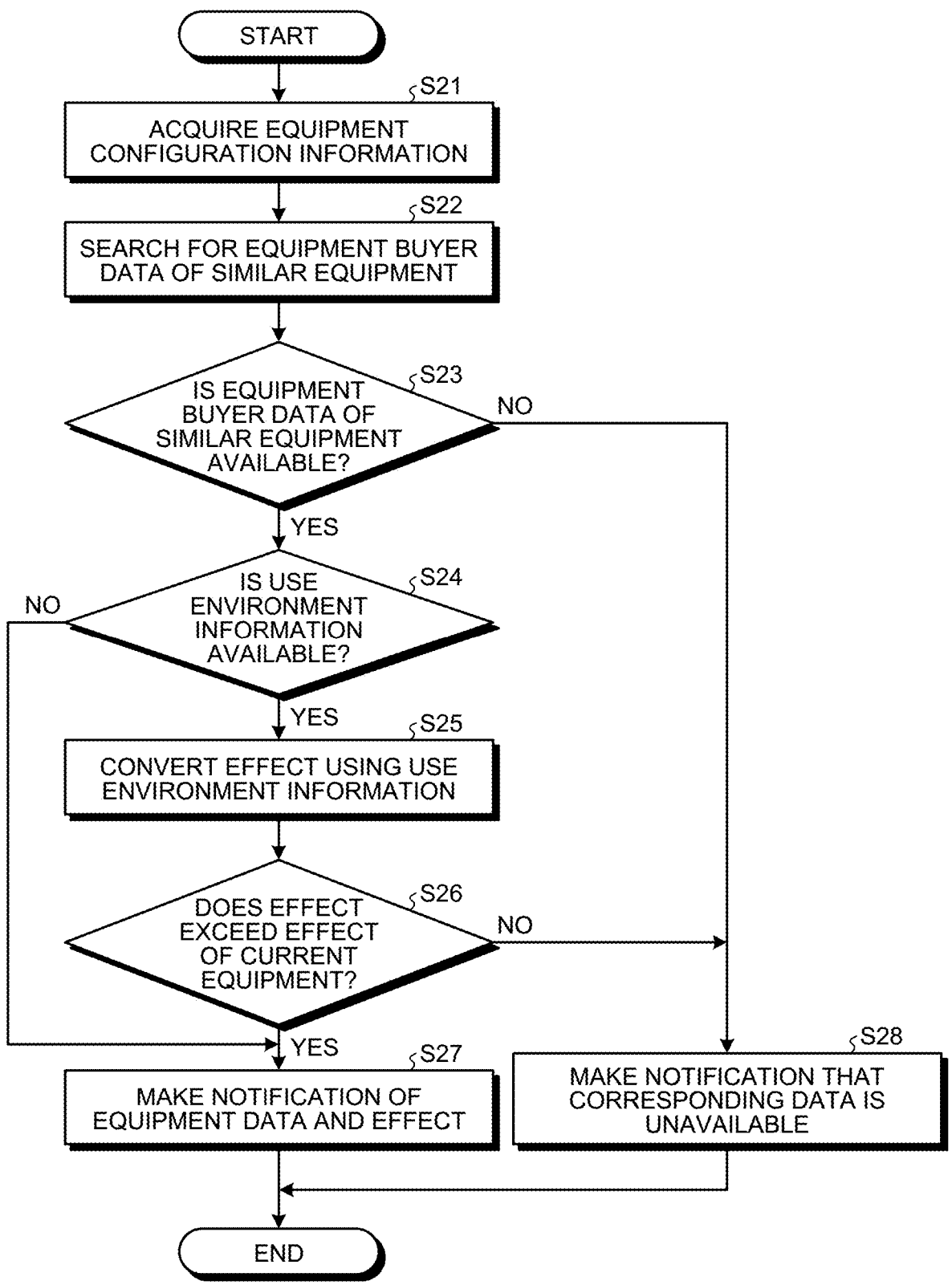
FIG. 6 is a flowchart illustrating an example of an operation of an equipment introduction effect analyzer according to a second embodiment.

FIG. 6 is a flowchart illustrating an example of the operation of the equipment introduction effect analyzer 10 according to the second embodiment.

When acquiring information on equipment, the potential equipment buyer 30 connects the terminal 31 to the search service unit 12 of the equipment introduction effect analyzer 10 via the network 1, and inputs information on the equipment in use, that is, information on the equipment currently in use, together with information on the use environment (corresponding to the use environment 302 illustrated in FIG. 3) including information such as desired cost recovery period and investable amount. The information input at this time is assumed to be similar to the equipment manufacturer name 401, the equipment name 402, the list price 403, the function 404, and the performance 405 included in the equipment data table 400 illustrated in FIG. 4. The terminal 31 transmits each of the input information to the search service unit 12 as equipment configuration information of the equipment currently in use, and requests a search.

Upon acquiring the equipment configuration information transmitted by the terminal 31 of the potential equipment buyer 30 (step S21), the equipment introduction effect analyzer 10 searches for equipment buyer data of equipment similar to the equipment currently in use by the potential equipment buyer 30, on the basis of the equipment configuration information acquired (step S22). Specifically, the matching engine unit 14 first searches for equipment data of equipment having the function and performance similar to (compatible with) those of the equipment indicated by the equipment configuration information acquired in step S21, from among the equipment data registered in the equipment data table 400. In this search, the matching engine unit 14 searches for equipment data in which the same equipment manufacturer name and equipment name as the equipment manufacturer name and equipment name included in the equipment configuration information are registered. Next, the matching engine unit 14 searches for equipment buyer data in which the function and performance that are similar to the function and performance registered in the equipment data obtained by the search or that can be replaced without any problem are registered, from among the equipment buyer data registered in the equipment buyer data table 200. For example, the matching engine unit 14 searches for equipment buyer data in which all the functions registered in the equipment data obtained by the search are registered, and in which the performance equivalent to or higher than the performance registered in the equipment data obtained by the search is registered. Note that in step S21, the matching engine unit 14 may also acquire information indicating whether or not each of the functions included in the equipment in use by the potential equipment buyer 30 is an essential function. In this case, in step S22, the matching engine unit 14 may search for equipment buyer data in which all essential functions of the functions registered in the equipment data obtained by the search are registered, and in which the performance equivalent to or higher than the performance registered in the equipment data obtained by the search is registered.

Next, the equipment introduction effect analyzer 10 checks whether or not the equipment buyer data of similar equipment is available, that is, whether the corresponding equipment buyer data has been found by the search in step S22 (step S23).

If the corresponding equipment buyer data is available (Yes in step S23), the equipment introduction effect analyzer 10 checks whether use environment information is available, that is, whether the equipment configuration information acquired in step S21 and the equipment buyer data found by the search in step S22 both include use environment information (step S24). The matching engine unit 14 performs the checking processing in each of steps S23 and S24.

If the use environment information is available (Yes in step S24), the equipment introduction effect analyzer 10 extracts the effect registered in the equipment buyer data found by the search in step S22 (corresponding to the effect 205 illustrated in FIG. 2), and converts the effect using the use environment information (step S25). Step S25 is the processing similar to step S16 illustrated in FIG. 5.

Next, the equipment introduction effect analyzer 10 checks whether the effect obtained by executing the conversion processing in step S25 exceeds the effect of the current equipment (step S26). That is, the equipment introduction effect analyzer 10 checks whether the effect obtained by executing the conversion processing in step S25 exceeds the effect included in the equipment configuration information acquired in step S21. Specifically, the evaluation engine unit 13 compares the cost recovery period and the investable amount indicated by the effect obtained in step S25 with the cost recovery period and the investable amount acquired in step S21, thereby determining whether the effect obtained by executing the conversion processing in step S25 exceeds the effect of the current equipment. In other words, it is determined whether the replacement of equipment generates benefits for the potential equipment buyer.

If the effect after conversion that is obtained by executing the conversion processing in step S25 exceeds the effect of the current equipment (Yes in step S26), the equipment introduction effect analyzer 10 notifies the terminal 31 of the potential equipment buyer 30 of information about the equipment suggested to be introduced, specifically, the equipment data and the effect (effect after conversion) corresponding to the equipment buyer data found by the search in step S22 (step S27), and ends the operation. The evaluation engine unit 13 performs the notification processing in step S27, that is, the processing of notifying the terminal 31 of the potential equipment buyer 30 of the information about the equipment suggested to be introduced.

Alternatively, if determining in step S24 that the use environment information is not available (No in step S24), the equipment introduction effect analyzer 10 notifies the terminal 31 of the potential equipment buyer 30 of the equipment data corresponding to the equipment buyer data found by the search in step S22 and the effect (the effect registered in the equipment buyer data found by the search in step S22) (step S27), and ends the operation. In this case, that is, when the notification is made in step S27 without executing step S25, a notification is also made that the equipment data and effect are reference information. The notification processing in step S27 in this case is also performed by the evaluation engine unit 13.

Moreover, if determining that the corresponding equipment buyer data is not available in step S23 (No in step S23), or that the effect after conversion does not exceed the effect of the current equipment in step S26 (No in step S26), the equipment introduction effect analyzer 10 notifies the terminal 31 of the potential equipment buyer 30 that the corresponding data is not available (step S28), and ends the operation. The search service unit 12 or the evaluation engine unit 13 performs the notification processing in step S28, that is, the processing of notifying the terminal 31 that the corresponding data is not available. Specifically, the search service unit 12 performs the notification processing in step S28 that is executed if the determination in step S23 is "No", and the evaluation engine unit 13 performs the notification processing in step S28 that is executed if the determination in step S26 is "No".

Note that the equipment introduction effect analyzer 10 of the present embodiment acquires the equipment configuration information of the equipment currently in use from the potential equipment buyer 30 in step S21, and uses the equipment configuration information to search for the equipment that can be suggested to be introduced, that is, the equipment more effective than the equipment currently in use. However, the present invention is not limited to this. The equipment introduction effect analyzer 10 may also be adapted to search for equipment that can be suggested to the equipment buyer 20 who has already registered each information of the equipment buyer data, and suggest the introduction of new equipment to the equipment buyer 20. An example of the equipment that can be suggested to the equipment buyer 20 is equipment that has the function similar to the function of the equipment already introduced by the equipment buyer 20, has the performance similar to or higher than the performance thereof, and is more effective than the equipment already introduced.

Next, the effect of the equipment introduction effect analyzer 10 according to the present embodiment will be described. The equipment introduction effect analyzer 10 according to the present embodiment can automatically derive the equipment, which is more effective than the equipment currently used by the potential equipment buyer 30 and gives benefits when introduced, by the matching engine unit 14 using the information in the equipment-related information storage unit 15 without the potential equipment buyer 30 having to input the detailed information of the desired equipment and performing the search as in the first embodiment. Therefore, if conditions such as the current equipment configuration and investment limits are input, equipment that is relatively effective is recommended from the equipment introduction effect analyzer 10 so that the time and effort required for considering the replacement of equipment or the like can be greatly reduced. In addition, even for a person who starts with a survey or search for equipment as in the first embodiment, once he purchases equipment and registers information on the equipment buyer data (the user 201 to the comment 207 illustrated in FIG. 2), the matching engine unit 14 treats the equipment buyer 20 as a next potential equipment buyer 30 from the next time and suggests next equipment replacement, so that this cycle naturally contributes to increasing the equipment buyer data and provides more useful information to the potential equipment buyer 30 and the equipment buyer 20. In summary, the effect of the present embodiment is to contribute to labor saving in the implementation of the first embodiment, and to increase the number of implementations and enhance the effect thereof.

Figure 7:
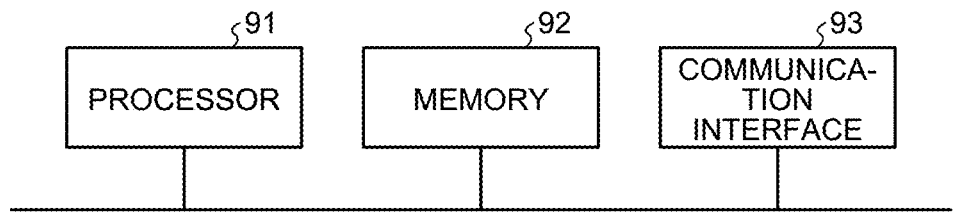
FIG. 7 is a diagram illustrating an example of hardware for implementing the equipment introduction effect analyzer according to the first and second embodiments.

Finally, hardware for implementing the equipment introduction effect analyzer 10 will be described. FIG. 7 is a diagram illustrating an example of the hardware for implementing the equipment introduction effect analyzer 10 according to the first and second embodiments. The equipment introduction effect analyzer 10 can be implemented by a processor 91, a memory 92, and a communication interface 93 illustrated in FIG. 7.

The processor 91 can be a central processing unit (CPU), a system large scale integration (LSI), or the like, the CPU being also referred to as a central processor, a processing unit, an arithmetic unit, a microprocessor, a microcomputer, or a digital signal processor (DSP). The memory 92 can be a random access memory (RAM), a read only memory (ROM), an erasable programmable read only memory (EPROM), an electrically erasable programmable read only memory (EEPROM (registered trademark)), a hard disk drive, or the like. The communication interface 93 can be, for example, a network interface card.

The registration service unit 11, the search service unit 12, the evaluation engine unit 13, and the matching engine unit 14 of the equipment introduction effect analyzer 10 are implemented by the processor 91 executing a program for operating as each of these units. The program for operating as each of the registration service unit 11, the search service unit 12, the evaluation engine unit 13, and the matching engine unit 14 is stored in advance in the memory 92. The processor 91 operates as the registration service unit 11, the search service unit 12, the evaluation engine unit 13, and the matching engine unit 14 by reading the above program from the memory 92 and executing the program.

The equipment-related information storage unit 15 is implemented by the memory 92. Note that the communication interface 93 is used when the equipment introduction effect analyzer 10 communicates with the terminal 21, the equipment 22, and the terminal 31 via the network 1.

Note that the program for operating as each of the search service unit 12, the evaluation engine unit 13, and the matching engine unit 14 is stored beforehand in the memory 92 in the above description, but it is not limited thereto. The above program may be written on a recording medium such as a compact disc (CD)-ROM or a digital versatile disc (DVD)-ROM to be supplied to a user, and may be installed in the memory 92 by the user. In this case, the hardware that implements the equipment introduction effect analyzer 10 includes a reading device for reading the program from the recording medium or an interface circuit for connecting the reading device.

Third Embodiment

Next, an information processing apparatus according to a third embodiment will be described. The configuration of the information providing system including the information processing apparatus according to the present embodiment and the configuration of the equipment introduction effect analyzer being the information processing apparatus are similar to those of the first embodiment (see FIG. 1).

In the equipment introduction effect analyzer 10 of the information providing system 100 according to the first embodiment, the evaluation engine unit 13 calculates the information useful for the potential equipment buyer 30 to determine whether or not to purchase equipment, on the basis of the use environment information registered in the equipment buyer data, the use environment information registered in the potential equipment buyer data, and the information on the effect registered in the equipment buyer data. The present embodiment describes the equipment introduction effect analyzer in which the evaluation engine unit 13 is implemented by a machine learning device.

Figure 8:
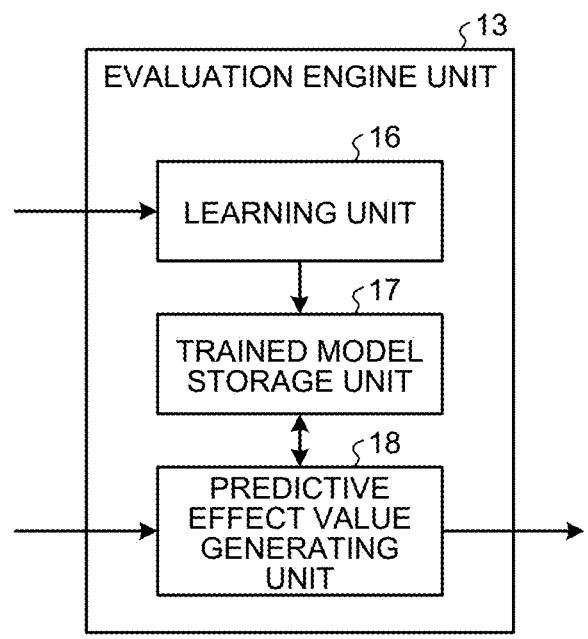
FIG. 8 is a diagram illustrating an example of a configuration of an evaluation engine unit according to a third embodiment.

FIG. 8 is a diagram illustrating an example of a configuration of the evaluation engine unit 13 according to the third embodiment. The evaluation engine unit 13 according to the third embodiment includes a learning unit 16, a trained model storage unit 17, and a predictive effect value generating unit 18.

The learning unit 16 learns an effect obtained when equipment is introduced on the basis of the information registered in the equipment buyer data table 200 (see FIG. 2) and the equipment data table 400 (see FIG. 4) held in the equipment-related information storage unit 15, and generates a trained model.

The trained model storage unit 17 receives the trained model generated by the learning unit 16 from the learning unit 16, and stores the trained model.

On the basis of the use environment information and information related to features of the equipment considered for purchase that are acquired from the potential equipment buyer 30 and the trained model that is held in the trained model storage unit 17, the predictive effect value generating unit 18 generates a predictive effect value that is a result of prediction of the effect obtained when the potential equipment buyer 30 introduces the equipment, and outputs the generated predictive effect value as introduction effect information. Note that the trained model storage unit 17 may be placed inside the learning unit 16 or the predictive effect value generating unit 18.

Figure 9:
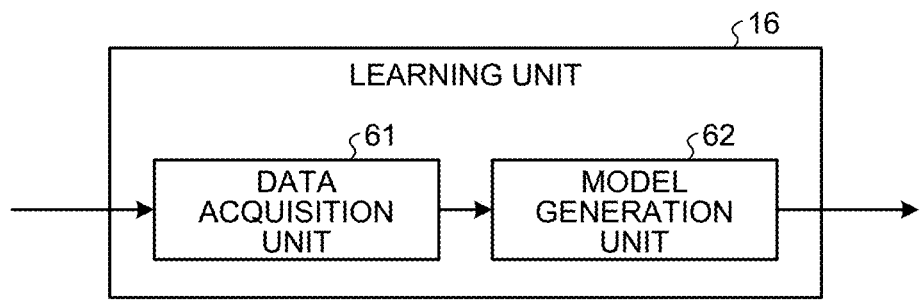
FIG. 9 is a diagram illustrating an example of a configuration of a learning unit included in the evaluation engine unit according to the third embodiment.

FIG. 9 is a diagram illustrating an example of a configuration of the learning unit 16 included in the evaluation engine unit 13 according to the third embodiment. The learning unit 16 includes a data acquisition unit 61 and a model generation unit 62.

From the equipment buyer data table 200 and the equipment data table 400 held in the equipment-related information storage unit 15, the data acquisition unit 61 acquires the equipment manufacturer name 202 and the equipment name 203 as identification information of the equipment, the function 404 and the performance 405 as feature information indicating the features of the equipment, the use environment 206, and the effect 205. Note that the data acquisition unit 61 acquires the function 404 and the performance 405 associated with the equipment manufacturer name 401 and the equipment name 402 that have the same values as the equipment manufacturer name 202 and the equipment name 203.

The model generation unit 62 learns a predictive effect value on the basis of training data that is created on the basis of a combination of the equipment manufacturer name 202, the equipment name 203, the function 404, the performance 405, the use environment 206, and the effect 205 acquired by the data acquisition unit 61. That is, the model generation unit 62 generates a trained model that predicts the optimum predictive effect value from the equipment manufacturer name 202, the equipment name 203, the function 404, the performance 405, the use environment 206, and the effect 205. Here, the training data is data in which the equipment manufacturer name 202, the equipment name 203, the function 404, the performance 405, the use environment 206, and the effect 205 are associated with one another. The equipment manufacturer name 202 and the equipment name 203 are information for identifying the equipment, and the use environment 206 is information indicating the environment and conditions under which the equipment is used (such as the presence or absence of an operator, power supply voltage, and air temperature). The effect 205 is information indicating the effect obtained when the equipment identified by the equipment manufacturer name 202 and the equipment name 203 is used under the environment and conditions indicated by the use environment 206. The predictive effect value is a predictive value of the effect obtained when the equipment is introduced.

Note that although the evaluation engine unit 13 includes the learning unit 16 in the present embodiment, the learning unit 16 may be placed outside the evaluation engine unit 13. Alternatively, the learning unit 16 may be implemented by a machine learning device external to the equipment introduction effect analyzer 10. That is, the learning unit 16 may be implemented by, for example, a machine learning device connected to the equipment introduction effect analyzer 10 via the network 1. In this case, the machine learning device that implements the learning unit 16 may be on a cloud server.

The learning algorithm used by the model generation unit 62 can be a known algorithm such as supervised learning, unsupervised learning, or reinforcement learning. As an example, a case where a neural network is applied will be described.

The model generation unit 62 learns a predictive effect value by, for example, so-called supervised learning according to a neural network model. Here, supervised learning refers to a model that gives a large number of sets of data of certain input and result (label) to the machine learning device, learns features in those pieces of training data, and estimates the result from the input.

The neural network includes an input layer including a plurality of neurons, a middle layer (hidden layer) including a plurality of neurons, and an output layer including a plurality of neurons. The middle layer may be one layer or two or more layers.

Figure 10:
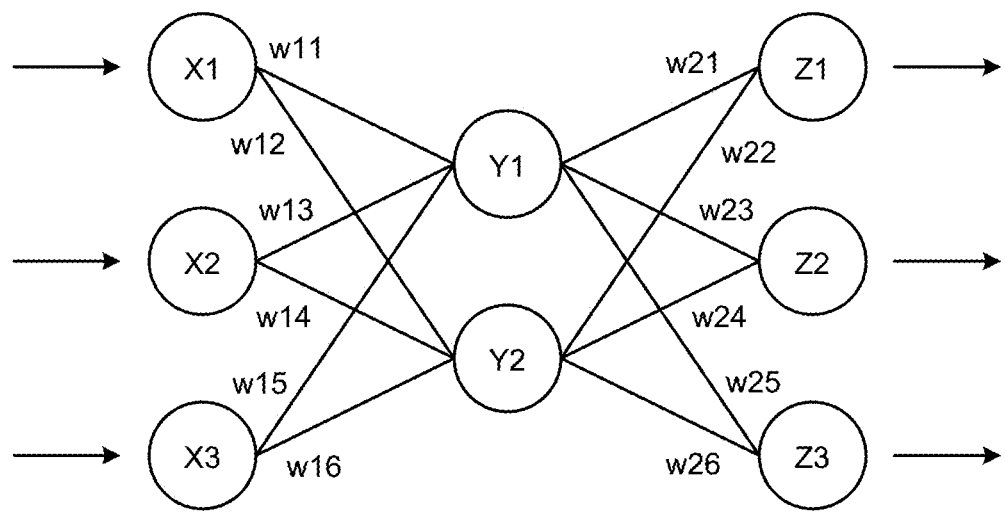
FIG. 10 is a diagram illustrating an example of a configuration of a neural network.

For example, in the case of a three-layer neural network as illustrated in FIG. 10, when multiple pieces of data are input to the neurons (X1 to X3) in the input layer, the neurons multiply the input data values by weights W1 (w11 to w16) and output them to the neurons (Y1 and Y2) in the middle layer. That is, each neuron in the input layer outputs the value obtained by multiplying the input value by the weight W1 toward all the neurons in the middle layer. Similarly, each neuron in the middle layer multiplies the input value by the weight W2 (w21 to w26) and outputs it to each neuron (Z1 to Z3) in the output layer. Each neuron in the output layer outputs the value input from each neuron in the middle layer to the outside. The output result varies depending on the values of the weights W1 and W2.

The neural network applied to the model generation unit 62 learns the predictive effect value by so-called supervised learning according to the training data input from the data acquisition unit 61.

That is, the model generation unit 62 adjusts the weights W1 and W2 such that, when the equipment manufacturer name 202, the equipment name 203, the function 404, the performance 405, and the use environment 206 among the data included in the training data are input to the input layer of the neural network, the result output from the output layer approximates the effect 205. Note that the training data acquired by the data acquisition unit 61 may be the equipment manufacturer name 202, the equipment name 203, and the use environment 206. In this case, the model generation unit 62 acquires the function 404 and the performance 405 corresponding to the equipment manufacturer name 202 and the equipment name 203 from the equipment data table 400, and inputs the function 404 and the performance 405 to the neural network together with the equipment manufacturer name 202, the equipment name 203, and the use environment 206 received from the data acquisition unit 61.

The model generation unit 62 generates a trained model by executing the above learning, and outputs the trained model to the trained model storage unit 17.

Figure 11:
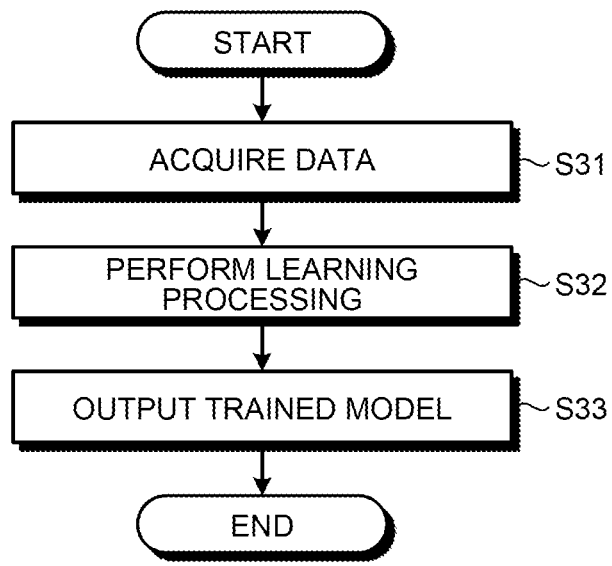
FIG. 11 is a flowchart illustrating a learning operation of the learning unit included in the evaluation engine unit according to the third embodiment.

Next, the operation in which the learning unit 16 learns the predictive effect value will be described with reference to FIG. 11. FIG. 11 is a flowchart illustrating a learning operation of the learning unit 16 included in the evaluation engine unit 13 according to the third embodiment.

In the learning unit 16, first, the data acquisition unit 61 acquires data required for the learning processing, specifically, the equipment manufacturer name 202, the equipment name 203, the function 404, the performance 405, the use environment 206, and the effect 205, from the equipment-related information storage unit 15 (step S31). Note that the data acquisition unit 61 acquires all combinations of the equipment manufacturer name 202, the equipment name 203, the function 404, the performance 405, the use environment 206, and the effect 205 held in the equipment-related information storage unit 15.

Next, the model generation unit 62 performs the learning processing (step S32). That is, the model generation unit 62 learns a predictive effect value by so-called supervised learning according to training data created on the basis of the combination of the equipment manufacturer name 202, the equipment name 203, the function 404, the performance 405, the use environment 206, and the effect 205 acquired by the data acquisition unit 61, and generates a trained model. The model generation unit 62 learns the predictive effect value using all the combinations of the equipment manufacturer name 202, the equipment name 203, the function 404, the performance 405, the use environment 206, and the effect 205 acquired by the data acquisition unit 61.

Next, the model generation unit 62 outputs the trained model generated in step S32 to the trained model storage unit 17 (step S33). The trained model storage unit 17 stores the trained model received from the model generation unit 62.

Alternatively, in step S31 above, although the data acquisition unit 61 simultaneously acquires the pieces of data required for the learning processing performed by the model generation unit 62, the pieces of data may be acquired at different timings as long as the training data can be created by associating the pieces of data in the end.

Figure 12:
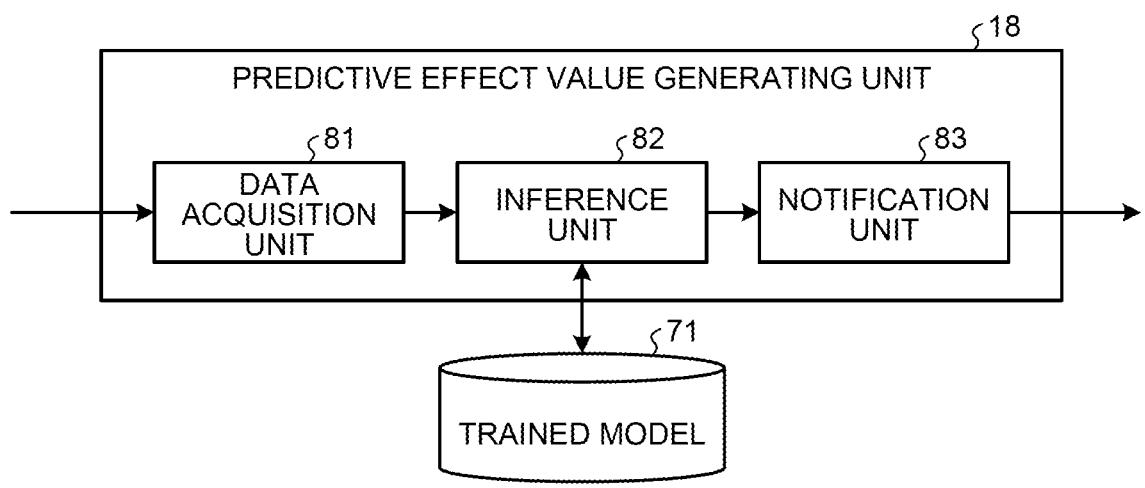
FIG. 12 is a diagram illustrating an example of a configuration of a predictive effect value generating unit included in the evaluation engine unit according to the third embodiment.

FIG. 12 is a diagram illustrating an example of a configuration of the predictive effect value generating unit 18 included in the evaluation engine unit 13 according to the third embodiment. The predictive effect value generating unit 18 includes a data acquisition unit 81, an inference unit 82, and a notification unit 83. Note that a trained model 71 illustrated in FIG. 12 is the trained model stored in the trained model storage unit 17.

The data acquisition unit 81 acquires data related to equipment considered for purchase by the potential equipment buyer 30, specifically, the equipment manufacturer name, the equipment name, the features of the equipment, and the use environment. The data acquisition unit 81 acquires these pieces of data from the terminal 31 owned by the potential equipment buyer 30 and the potential equipment buyer data table 300 held in the equipment-related information storage unit 15. Note that the data acquisition unit 81 may also acquire data on the use environment from the terminal 31 owned by the potential equipment buyer 30.

The inference unit 82 infers a predictive effect value by using the trained model 71 stored in the trained model storage unit 17. That is, the inference unit 82 receives the equipment manufacturer name, the equipment name, the features of the equipment, and the use environment from the data acquisition unit 81, inputs each received data into the trained model 71 stored in the trained model storage unit 17, and acquires the predictive effect value that is inferred from the equipment manufacturer name, the equipment name, the features of the equipment, and the use environment and is output from the trained model 71.

The notification unit 83 notifies the terminal 31 of the potential equipment buyer 30 of an inference result output from the inference unit 82, that is, the predictive effect value.

Note that in the present embodiment, the predictive effect value generating unit 18 generates the predictive effect value using the trained model 71 generated by the learning unit 16 of the evaluation engine unit 13, but the predictive effect value may be generated using the trained model 71 that is acquired from the outside of the equipment introduction effect analyzer 10. For example, the trained model storage unit 17 receives and stores the trained model 71 generated by an evaluation engine unit of another equipment introduction effect analyzer, so that the predictive effect value generating unit 18 may generate the predictive effect value using the trained model 71 held in the trained model storage unit 17.

Figure 13:
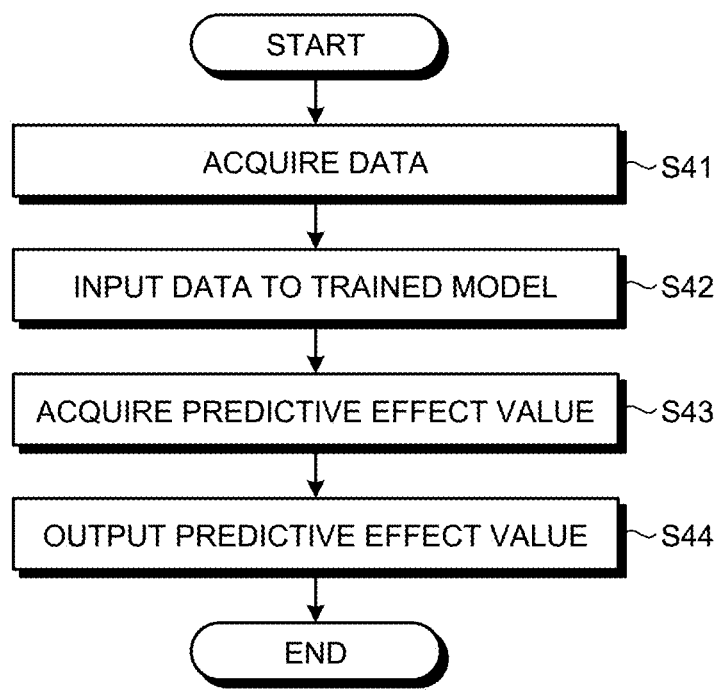
FIG. 13 is a flowchart illustrating a predictive effect value generating operation of the predictive effect value generating unit included in the evaluation engine unit according to the third embodiment.

Next, the operation in which the predictive effect value generating unit 18 generates the predictive effect value will be described with reference to FIG. 13. FIG. 13 is a flowchart illustrating the predictive effect value generating operation of the predictive effect value generating unit 18 included in the evaluation engine unit 13 according to the third embodiment. Here, the equipment introduction effect analyzer 10 according to the third embodiment executes the operation in which the predictive effect value generating unit 18 generates the predictive effect value illustrated in FIG. 13, in place of step S16 of the flowchart illustrated in FIG. 5 described in the first embodiment, and step S25 of the flowchart illustrated in FIG. 6 described in the second embodiment. That is, the evaluation engine unit 13 of the equipment introduction effect analyzer 10 according to the first and second embodiments converts, in steps S16 and S25 above, the information on the effect registered in the equipment buyer data on the basis of the use environment information registered in the equipment buyer data and the use environment information registered in the potential equipment buyer data, thereby finding the predictive effect value that is the effect obtained when the potential equipment buyer 30 introduces the equipment under consideration. On the other hand, in steps S16 and S25 above, the evaluation engine unit 13 of the equipment introduction effect analyzer 10 according to the third embodiment finds the predictive effect value on the basis of the trained model, the equipment manufacturer name, the equipment name, the features of the equipment, and the use environment.

When the predictive effect value generating unit 18 generates the predictive effect value, the data acquisition unit 81 first acquires data related to the equipment considered for purchase by the potential equipment buyer 30, specifically, the equipment manufacturer name, the equipment name, the features of the equipment, and the use environment, from the terminal 31 owned by the potential equipment buyer 30 (step S41).

Next, the inference unit 82 inputs the data acquired by the data acquisition unit 81, specifically, the equipment manufacturer name, the equipment name, the features of the equipment, and the use environment, to the trained model 71 stored in the trained model storage unit 17 (step S42), and acquires the predictive effect value output as a result from the trained model 71 (step S43). The inference unit 82 outputs the predictive effect value acquired from the trained model 71 to the notification unit 83 (step S44).

Upon receiving the predictive effect value from the inference unit 82, the notification unit 83 makes a response with the received predictive effect value as the effect that is obtained when the equipment is used in the use environment of the potential equipment buyer 30. The potential equipment buyer 30 can thus know a rough estimate of the effect obtained when the equipment is introduced without purchasing the equipment that has not been purchased, and can use the rough estimate in considering the purchase of the equipment in terms of cost-effectiveness information.

When the potential equipment buyer 30 actually purchases the equipment as a result of considering the purchase of the equipment, the information providing system 100 acquires information on an effect actually obtained after the purchase of the equipment, creates new equipment buyer data including the acquired information on the effect, and registers the data in the equipment buyer data table 200 in the equipment-related information storage unit 15. When creating the new equipment buyer data, the information providing system 100 causes the learning unit 16 to perform re-learning using the new equipment buyer data, and updates the trained model.

Note that although the evaluation engine unit 13 includes the predictive effect value generating unit 18 in the present embodiment, the predictive effect value generating unit 18 may be placed outside the evaluation engine unit 13. Moreover, for example, an inference device external to the equipment introduction effect analyzer 10 may implement the predictive effect value generating unit 18. That is, the predictive effect value generating unit 18 may be implemented by, for example, an inference device connected to the equipment introduction effect analyzer 10 via the network 1. In this case, the inference device that implements the predictive effect value generating unit 18 may be on a cloud server.

Note that the present embodiment has described the example in the case where supervised learning is applied as the learning algorithm used by the model generation unit 62 of the learning unit 16, but the present invention is not limited to such an example. Besides supervised learning, it is also possible to apply reinforcement learning, unsupervised learning, semi-supervised learning, or the like as the learning algorithm.

Moreover, the model generation unit 62 may learn the predictive effect value according to the training data created for a plurality of the evaluation engine units 13. In this case, in the learning unit 16 including the model generation unit 62 to be trained, the data acquisition unit 61 acquires the equipment manufacturer name 202, the equipment name 203, the function 404, the performance 405, the use environment 206, and the effect 205 stored in the equipment-related information storage unit 15 from the equipment-related information storage unit 15 included in each of one or more of the equipment introduction effect analyzers 10 different from the equipment introduction effect analyzer 10 including the evaluation engine unit 13 that includes the data acquisition unit 61 itself. Note that the data acquisition unit 61 may collect training data from a plurality of the equipment introduction effect analyzers 10 used in the same area and learn the predictive effect value, or may collect training data from a plurality of the equipment introduction effect analyzers 10 operating independently in different areas and learn the predictive effect value. Moreover, the equipment introduction effect analyzer 10 as a target from which the training data is collected can be added or removed to or from the target along the way. Furthermore, a trained model in which the predictive effect value is learned for the evaluation engine unit 13 of a certain equipment introduction effect analyzer 10 may be applied to the evaluation engine unit 13 included in another equipment introduction effect analyzer 10, so that the trained model may be updated by re-learning the predictive effect value for the evaluation engine unit 13 of the another equipment introduction effect analyzer.

Also, as the learning algorithm used in the model generation unit 62 of the learning unit 16, deep learning that learns extraction of a feature value itself can be used, or machine learning may be executed according to another known method such as genetic programming, functional logic programming, or support vector machine.

As described above, the evaluation engine unit 13 of the equipment introduction effect analyzer 10 according to the present embodiment learns the predictive effect value, which is the result of prediction of the effect obtained when the equipment is purchased, by using the identification information of the equipment already purchased by the equipment buyer 20, the feature information of the equipment, the information on the installation environment of the equipment, and the information on the effect obtained by introducing the equipment. The evaluation engine unit 13 further uses the trained model 71 that is a learning result of the predictive effect value, thereby predicting the effect obtained when the potential equipment buyer 30 introduces the equipment considered for purchase.

Note that the evaluation engine unit 13 according to the third embodiment performs the processing that predicts the effect (the effect obtained when the potential equipment buyer 30 introduces the equipment) using the trained model obtained by machine learning instead of the processing of the evaluation engine unit 13 according to the first embodiment (processing that generates the information on the effect obtained when the potential equipment buyer 30 introduces the equipment), but may be configured such that both of these processings can be selectively used. For example, the evaluation engine unit 13 can predict the effect by executing the processing described in the first embodiment when the number of pieces of the equipment buyer data registered in the equipment buyer data table 200 is under a predetermined number, or can predict the effect using the trained model in other cases. Also, the evaluation engine unit 13 can predict the effect by executing the processing described in the first embodiment when being able to predict the effect by executing the processing described in the first embodiment, specifically, when the determination in step S15 illustrated in FIG. 5 is "Yes", or can predict the effect using the trained model in other cases. Moreover, a user or administrator of the information providing system 100 may be allowed to select whether the evaluation engine unit 13 predicts the effect by executing the processing described in the first embodiment or by using the trained model.

Furthermore, in the third embodiment, the model generation unit 62 of the learning unit 16 uses the training data based on the combination of the equipment manufacturer name 202, the equipment name 203, the function 404, the performance 405, the use environment 206, and the effect 205 to learn the relationship between the effect 205 and the combination of the equipment manufacturer name 202, the equipment name 203, the function 404, the performance 405, and the use environment 206, but may perform the learning using different training data. For example, the learning may be performed using training data based on a combination of the equipment manufacturer name 202, the equipment name 203, the function 404, the performance 405, the use environment 206, and the effect 205, the use environment 302 included in the potential equipment buyer data, and the effect after conversion obtained by executing step S16 of FIG. 5 described in the first embodiment. That is, a method that converts the effect 205 into the effect provided to the potential equipment buyer 30 using the training data may be learned.

The configuration illustrated in the above embodiment merely illustrates an example of the content of the present invention, and can thus be combined with another known technique or partially omitted and/or modified without departing from the scope of the present invention.

REFERENCE SIGNS LIST 1 network; 10 equipment introduction effect analyzer; 11 registration service unit; 12 search service unit; 13 evaluation engine unit; 14 matching engine unit; 15 equipment-related information storage unit; 16 learning unit; 17 trained model storage unit; 18 predictive effect value generating unit; 20 equipment buyer; 21, 31 terminal; 22 equipment; 30 potential equipment buyer; 61, 81 data acquisition unit; 62 model generation unit; 71 trained model; 82 inference unit; 83 notification unit; 100 information providing system; 200 equipment buyer data table; 300 potential equipment buyer data table; 400 equipment data table.

The invention claimed is:
1. An information processing apparatus comprising:
processing circuitry; and
a memory to hold equipment data and equipment buyer data,
the equipment data including information on a function included in equipment and performance of the equipment, and
the equipment buyer data including information on an effect of the equipment obtained for an equipment buyer having already purchased the equipment, information on a first use environment of the purchased equipment, and information on the purchased equipment; and wherein
the memory further stores a program which, when executed by the processing circuitry, performs processes of:
generating information on an effect to be provided to a potential equipment buyer based on the information on the effect and the information on the first use environment of the purchased equipment in correlation to each other that are included in the equipment buyer data, and based on information on a second use environment different from the first use environment and in which the potential equipment buyer anticipates using under consideration equipment corresponding to the purchased equipment, the equipment buyer data being acquired from the equipment buyer having already purchased equipment with a desired function and performance desired by the potential equipment buyer who is considering purchasing the under consideration equipment, and outputting the generated information on the effect to be provided to the potential equipment buyer to an electronic terminal of the potential equipment buyer for the potential equipment buyer to determine whether to purchase the under consideration equipment,
wherein the generating information on the effect to be provided to the potential equipment buyer includes converting by calculation the information on the effect based on the information on the first use environment of the equipment included in the equipment buyer data in relation to the second use environment in which the potential equipment buyer anticipates using the under consideration equipment.
2. The information processing apparatus according to claim 1,
wherein the processes further include:
searching, using the processing circuitry, for equipment buyer data that is acquired from the equipment buyer having already purchased the equipment with the function and the performance desired by the potential equipment buyer, from among the equipment buyer data held in the memory, and
wherein the generating the information on the effect to be provided to the potential equipment buyer includes extracting the information on the effect included in the equipment buyer data that is found in the search, and converting the extracted information on the effect based on the information on the first use environment of the equipment included in the equipment buyer data from which the information is extracted, and the information on the second use environment in which the potential equipment buyer anticipates using the equipment.
3. The information processing apparatus according to claim 2, wherein
the processing circuitry is configured to perform:
an information acquisition function to acquire information on the under consideration equipment desired by the potential equipment buyer from the electronic terminal owned by the potential equipment buyer;
a first search function to search for equipment data including the information indicating the function and the performance desired by the potential equipment buyer who is considering purchasing the under consideration equipment, from among the equipment data held in the memory; and
a second search function to search for the equipment buyer data that is acquired from the equipment buyer having already purchased the equipment with the function and the performance desired by the potential equipment buyer, from among the equipment buyer data held in the memory,
when the information on the under consideration equipment acquired by executing the information acquisition function includes at least one of first information and second information, the processing circuitry executes the second search function by using one or both of the first information and the second information included in the information on the under consideration equipment, the first information indicating a name, designation, or model name of the under consideration equipment with the function and the performance desired by the potential equipment buyer, and the second information indicating a manufacturer name or seller name of the under consideration equipment with the function and the performance desired by the potential equipment buyer, and when the information on the under consideration equipment includes neither the first information nor the second information, the processing circuitry executes the first search function to search for the equipment data including the information indicating the function and the performance desired by the potential equipment buyer, and executes the second search function by using information included in the equipment data that is found in the search.

4. The information processing apparatus according to claim 3,
the processing circuitry further acquires equipment configuration information, and generates information about equipment that is suggested to be introduced for the potential equipment buyer and information on an effect obtained when the suggested equipment is introduced, based on the equipment configuration information acquired as well as the equipment data and the equipment buyer data that are held in the memory, the equipment configuration information including information on equipment in use by the potential equipment buyer, information on a function included in the equipment in use and on performance of the equipment in use, and information on the first use environment of the equipment in use.

5. The information processing apparatus according to claim 4, wherein
the processing circuitry generates information about equipment that can obtain a higher effect than the equipment in use by the potential equipment buyer based on the equipment data and the equipment buyer data held in the memory, and uses the generated information as information about the equipment that is suggested to be introduced for the potential equipment buyer.

6. The information processing apparatus according to claim 2, the processing circuitry further acquires equipment configuration information, and generates information about under consideration equipment that is suggested to be introduced for the potential equipment buyer and information on an effect obtained when the suggested under consideration equipment is introduced, based on the equipment configuration information acquired as well as the equipment data and the equipment buyer data that are held in the memory, the equipment configuration information including information on equipment in use by the potential equipment buyer, information on a function included in the equipment in use and on performance of the equipment in use, and information on the first use environment of the equipment in use.

7. The information processing apparatus according to claim 4, wherein
the processing circuitry generates information about under consideration equipment that can obtain a higher effect than the equipment in use by the potential equipment buyer based on the equipment data and the equipment buyer data held in the memory, and uses the generated information as information about the under consideration equipment that is suggested to be introduced for the potential equipment buyer.

8. The information processing apparatus according to claim 2, wherein
the equipment buyer data includes a running cost of the purchased equipment and a wage as the information on the first use environment of the purchased equipment, and
the processing circuitry calculates an effect based on the running cost of the purchased equipment and the wage included in the equipment buyer data, converts the calculated effect, and generates the information on the effect to be provided to the potential equipment buyer.

9. The information processing apparatus according to claim 1, wherein the processing circuitry further:
generates a trained model by learning an effect obtained when equipment is introduced based on the information on the effect and the information on the first use environment that are included in the equipment buyer data held in the memory, and the information on the function included in the equipment and on the performance of the equipment that is included in the equipment data held in the memory; and
generates information on the effect to be provided to the potential equipment buyer based on information on the second use environment in which the potential equipment buyer anticipates using the under consideration equipment, a function included in the under consideration equipment considered for purchase by the potential equipment buyer and performance of the under consideration equipment, and the trained model.

10. An information processing method comprising:
acquiring, using processing circuitry, equipment data and equipment buyer data,
the equipment data including information on a function included in equipment and performance of the equipment, and
the equipment buyer data including information on an effect of the equipment obtained for an equipment buyer having already purchased the equipment, information on a first use environment of the purchased equipment, and information on the purchased equipment;
generating, using the processing circuitry, information on an effect to be provided to a potential equipment buyer based on the information on the effect and the information on the first use environment of the purchased equipment in correlation to each other that are included in the equipment buyer data, and based on information on a second use environment different from the first use environment and in which the potential equipment buyer anticipates using under consideration equipment corresponding to the purchased equipment, the equipment buyer data being acquired from the equipment buyer having already purchased equipment with a desired function and performance desired by the potential equipment buyer who is considering purchasing the under consideration equipment; and
outputting, using the processing circuitry, the generated information on the effect to be provided to the potential equipment buyer to an electronic terminal of the potential equipment buyer for the potential equipment buyer to determine whether to purchase the under consideration equipment,
wherein the generating information on the effect to be provided to the potential equipment buyer includes converting by calculation the information on the effect based on the information on the first use environment of the equipment included in the equipment buyer data in relation to the second use environment in which the potential equipment buyer anticipates using the under consideration equipment.

11. An information providing system comprising:
an equipment buyer terminal to acquire equipment buyer data from an equipment buyer, the equipment buyer data including information on an effect obtained for the equipment buyer having already purchased equipment, information on a first use environment of the purchased equipment, and information on the purchased equipment;

a potential equipment buyer terminal to acquire, from a potential equipment buyer who is considering purchasing under consideration equipment corresponding to the purchased equipment, information on equipment with a function and performance desired by the potential equipment buyer; and an information processing apparatus to generate, based on the equipment buyer data acquired by the equipment buyer terminal, information on an effect obtained when the potential equipment buyer purchases the under consideration equipment corresponding to the information on the equipment acquired by the potential equipment buyer terminal, and output the generated information on the effect to be provided to the potential equipment buyer to the potential equipment buyer for the potential equipment buyer to determine whether to purchase the under consideration equipment, wherein the information processing apparatus includes:

a memory to hold equipment data and the equipment buyer data acquired by the equipment buyer terminal, the equipment data including information on a function included in equipment and performance of the equipment; and a processor to generate information on an effect to be provided to the potential equipment buyer based on the information on the effect and the information on the first use environment of equipment that are included in the equipment buyer data and information on a second use environment different from the first use environment and in which the potential equipment buyer anticipates using the equipment, the equipment buyer data being acquired by the equipment buyer terminal from the equipment buyer having already purchased the equipment with the function and the performance desired by the potential equipment buyer, wherein the generation of the information on the effect to be provided to the potential equipment buyer includes converting by calculation the information on the effect based on the information on the first use environment of the equipment included in the equipment buyer data in relation to the second use environment in which the potential equipment buyer anticipates using the under consideration equipment.

* * * * *